United States Patent [19]
Nelson

[11] 3,814,025
[45] June 4, 1974

[54] TRANSPORTATION SYSTEM
[75] Inventor: Roy A. Nelson, Grand Prairie, Tex.
[73] Assignee: LTV Aerospace Corporation, Dallas, Tex.
[22] Filed: June 1, 1972
[21] Appl. No.: 258,701

[52] U.S. Cl. .................. 104/242, 238/3, 280/91
[51] Int. Cl. ............................................ B62d 11/04
[58] Field of Search .................... 104/247–248; 238/10 R, 1, 2, 3, 4; 280/95 X, 81 A, 64, 91, 63

[56] References Cited
UNITED STATES PATENTS

| | | | |
|---|---|---|---|
| 2,061,719 | 11/1936 | Street | 280/91 X |
| 2,181,377 | 11/1939 | Mabie | 238/3 |
| 3,331,557 | 7/1967 | Rooney | 238/3 |
| 3,666,034 | 5/1972 | Stuller et al. | 280/91 |

*Primary Examiner*—M. Henson Wood, Jr.
*Assistant Examiner*—Richard A. Bertsch
*Attorney, Agent, or Firm*—Walter J. Jagmin; H. C. Goldwire

[57] ABSTRACT

A transportation system including a roadway having a pair of elongated parallel tracks whose shape in cross-section is domed or convex and a pair of guide flanges positioned outwardly of the tracks, and a vehicle having wheels provided with resilient track-engaging means, such as pneumatic tires, and driving means for propelling the vehicle over the roadway. The wheels of the vehicle tend to follow the tracks because of the deformation of the tires if they tend to move laterally off the center portions of the tracks, and the guide flanges engage the tires, upon the wheels having moved off the tracks because of the imposition of excessive side loads on the vehicle, to turn the wheels back onto the tracks.

6 Claims, 8 Drawing Figures

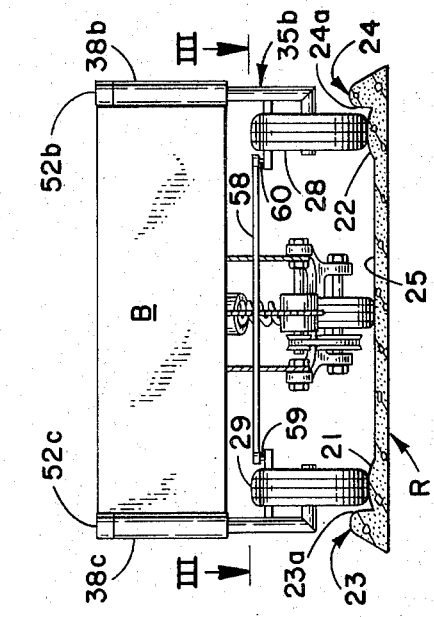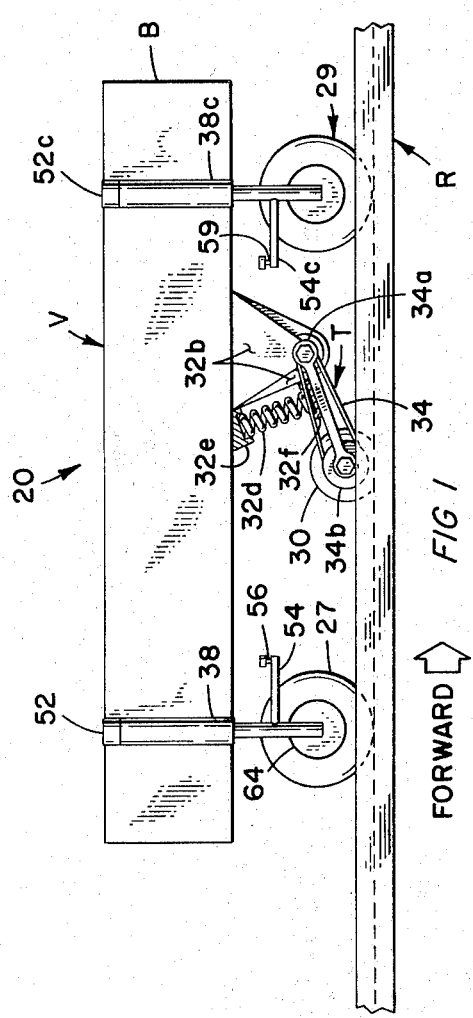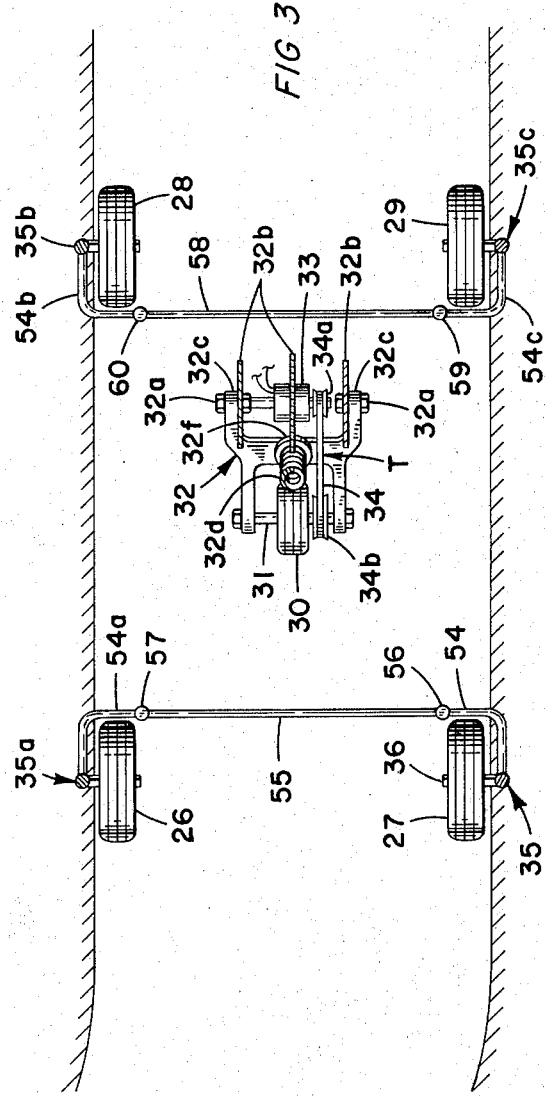

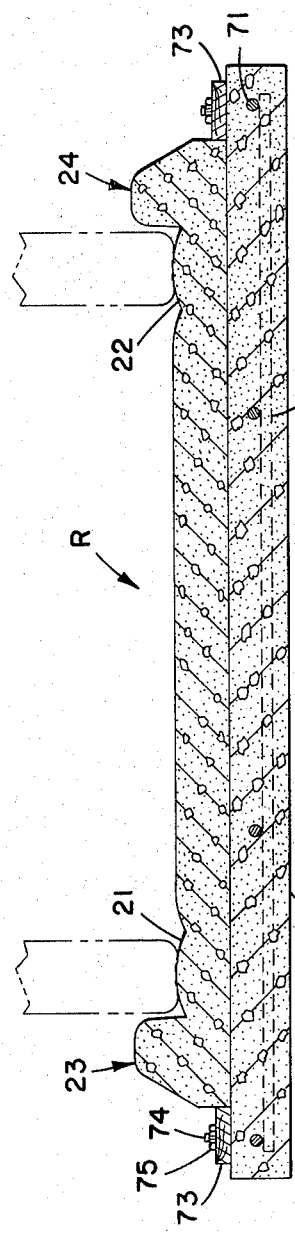
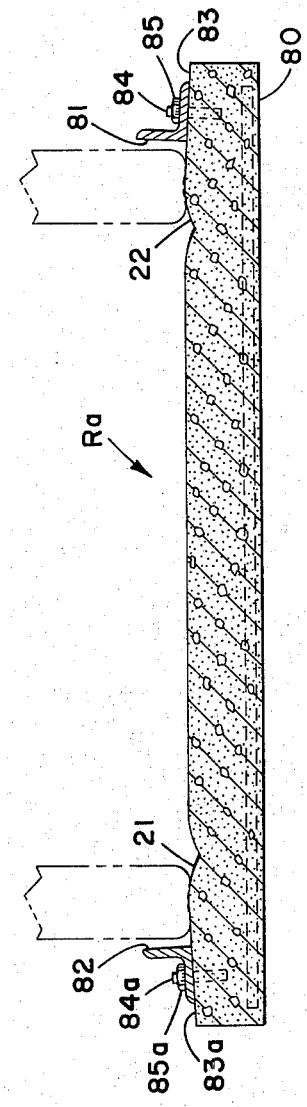

TRANSPORTATION SYSTEM

This invention relates to transportation systems and more particularly to ground transportation systems.

An object of this invention is to provide a new and improved transportation system having a roadway provided with parallel tracks and selfsteering vehicles which automatically follow the tracks of the roadway.

Another object is to provide a roadway having a pair of parallel tracks having top surfaces which extend divergently downwardly relative to their longitudinal center planes, along which the resilient wheels of a vehicle roll.

Still another object is to provide a roadway, of the type described, having longitudinal guide flanges positioned outwardly of the tracks for engaging a wheel of a vehicle rolling on and along the tracks in the event of excessive lateral outward displacement of the wheel from the central portion of the track adjacent the guide flanges and turning the wheel back onto the track.

An important object of the invention is to provide a vehicle having individual pairs of wheels, each pair being linked together for simultaneous free-turning movement about substantially vertical axes, the wheels having resilient peripheral means, such as tires, which deform as the wheels tend to move laterally off the central portions of the parallel tracks of the roadway to increase the peripheral speed of rotation of the portions of the tires tending to move downwardly off the central portions of the tracks and thus turn the wheels back onto the central portions of the tracks.

Another object is to provide a vehicle, of the type described, wherein each of the wheels is mounted for free-turning movement about a substantially vertical axis spaced outwardly of the outer side of the wheel, whereby the reaction forces due to the engagement of the wheel with a guide flange disposed outwardly of the track, when a wheel turns outwardly and tends to move off the track, causes the wheel to turn back onto the track.

Still another object is to provide a vehicle, of the type described, wherein the wheel-mounting means compensate for unbalances of loads on the vehicle to cause the wheels to tend to remain on the tracks even though the load carried by the vehicle is not centrally positioned on the vehicle.

Additional objects and advantages of the invention will be readily apparent from the reading of the following description of a device constructed in accordance with the invention, and reference to the accompanying drawings thereof, wherein:

FIG. 1 is a side elevational view of a portion of the transportation system showing a vehicle on the roadway of the transportation system.

FIG. 2 is a front elevational view;

FIG. 3 is a sectional view taken on line III—III of FIG. 2;

FIG. 6 is a transverse sectional view of a modified form of the roadway;

FIG. 7 is a transverse sectional view of another modified form of the roadway.

Figure 4:
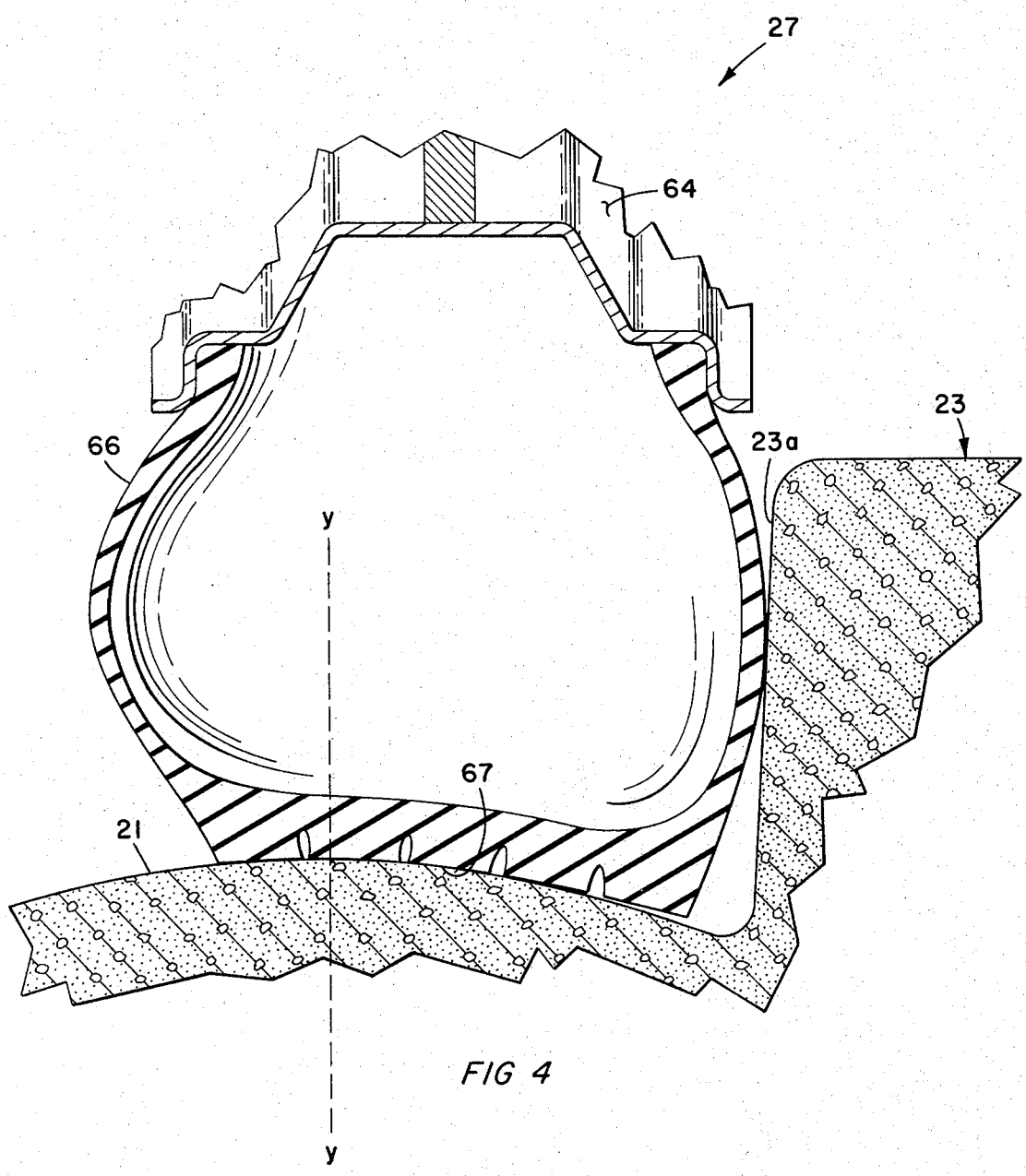
FIG. 4 is an enlarged sectional view of a wheel of the vehicle on one of the tracks of the roadway.
Figure 5:
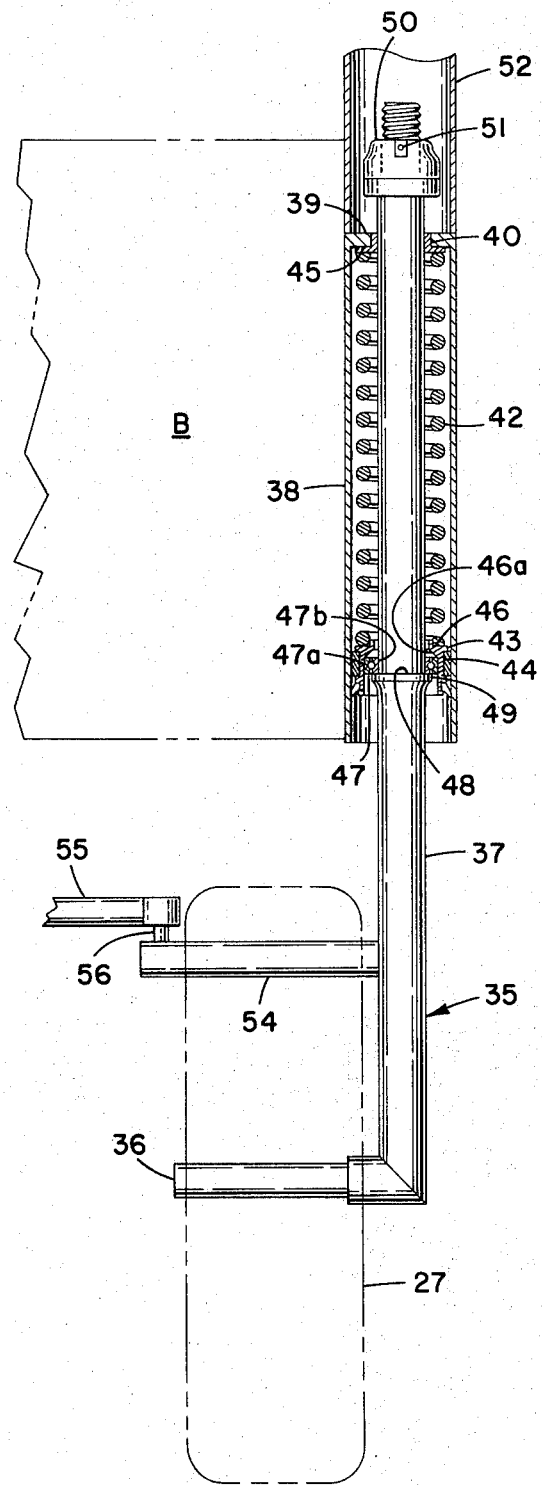
FIG. 5 is an enlarged sectional view showing the mounting of one of the wheels of the vehicle.

Referring now to FIGS. 1 through 5 of the drawings, the transportation system 20 embodying the invention includes a roadway R along which vehicles, one of which vehicles is shown as vehicle V, may move in a predetermined path. The roadway R may be formed of concrete, and its upper surface has a pair of parallel tracks 21 and 22, whose shape in cross-section is convex, located inwardly of a pair of guide flanges 23 and 24 whose upwardly divergent surfaces 23a and 24a, respectively, extend upwardly and outwardly from the outer edges of the tracks 21 and 22. The roadway R between the tracks 21 and 22 provides a flat surface 25.

The tracks 21 and 22 are engageable by a pair of rear wheels 26 and 27 and a pair of front wheels 28 and 29 of a vehicle V.

The vehicle V may be propelled along the roadway R by any suitable means which, ideally, does not introduce any lateral force to the vehicle. One example of a suitable propelling-means is shown in FIGS. 1, 2 and 3 as a drive wheel 30 which engages the flat central surface 25 of the roadway and is rigidly secured to a shaft 31 rotatably journaled in a suitable bearing means of a bracket 32 whose upper end is pivotally secured to the underside of the vehicle by means of pivot pins 32a and plates 32b. The plates 32b are rigidly secured to the underside of the vehicle body B and depend therefrom. The pivot pins 32a extend through aligned apertures in the plates 32b and the spaced arms 32c of the bracket 32. A spring 32d biases the bracket 32 downwardly, the upper end portion of the spring 32d bearing against a spring retainer 32e secured to the underside of the vehicle body B and the lower end portion of the spring 32d bearing against the crossmember 32f of the bracket 32.

If the drive wheel 30 is located at the center of the turning geometry of the four main wheels 26, 27, 28, 29, then the drive wheel does not have to turn separately from the vehicle when the vehicle proceeds around a curve in the roadway.

In another form of propelling means, the drive wheel 30 is located at the rear of the vehicle. This location of the drive wheel 30 would necessitate a trunnion mount to allow the drive wheel to turn and follow the vehicle around a curve in the roadway.

The drive wheel 30 is driven by any suitable driving means, such as an electric motor 33 mounted on the underframe of the vehicle V, whose drive shaft is connected to the wheel shaft 31 by any suitable transmission T. For example, the transmission T may be of the belt and pulley type comprising pulleys 34a and 34b rigidly secured to the drive shaft of the motor 33 and the wheel shaft 31, respectively, and a belt 34.

The wheel 27 of the vehicle V is mounted for turning or steering movement about a substantially vertical axis spaced outwardly of the outer side of the wheel by means of a kingpin 35 on whose inwardly extending horizontal axle portion 36 the wheel is rotatably mounted by any suitable bearing means.

The vertical portion 37 of the kingpin 35 telescopes upwardly into a tubular, kingpin housing 38 rigidly secured to the vehicle body B, in any suitable manner.

The kingpin housing 38 is provided at its upper end with an internal, annular flange 39 in which is mounted a dry bushing 40. A helical spring 42, positioned within the interior of the housing 38, extends about the upper portion of the kingpin 35.

A retainer ring 43 is telescoped within the lower portion of the interior of the housing 38 and has mounted thereon a dry bearing ring 44 which slidingly engages the internal cylindrical surface of the housing. The dry bearing ring 44 has the additional function of acting as a friction-damper for the helical suspension-spring 42, thereby eliminating the need for a hydraulic damper or shock absorber. Because the centerline of the helical spring 42 is offset from the centerline of the wheel 27, a moment exists which is proportional to the wheel and spring load. This moment is resisted by a couple provided between the dry bushings 40 and 44, in conjunction with the housing 38, to give a friction-damper force that is proportional to the spring load.

The upper end-portion of the spring 42 engages the annular bottom surface of the top bushing 40 while its bottom portion engages the annular top surface 46 of the retainer ring 43.

A roller-bearing assembly 47 is disposed in the retainer ring 43 with the upward movement of the assembly in the retainer ring being limited by the engagement of the outer race 47a of the bearing assembly with the downwardly facing shoulder 46a of the retainer ring. Upward movement of the kingpin 35 relative to the roller-bearing assembly 47 is limited by the engagement of the annular surface 48 of the external, annular flange 49 of the kingpin with the bottom surface of the inner race 47b of the roller-bearing assembly.

Upward movement of the vehicle relative to the kingpin 35 is limited by a stop ring 50 threaded onto the threaded upper end-portion of the kingpin above the top flange 39 of the housing 38. The stop ring 50 is locked in any adjusted position on the kingpin 35 by a set screw 51. A cover 52 may be positioned over the housing 38 and the top end of the kingpin 35.

The kingpin 35 has an arm 54 which extends forwardly and then inwardly, with respect to the vehicle V, and is pivotally connected to one end of a tie rod 55 by a suitable pin 56 which may extend upwardly into a suitable socket of the tie rod 55.

The kingpins of the wheels 26, 28 and 29 are identical in structure to the kingpin 35 and accordingly, their elements and those of their mounting means have been provided with the same reference numerals, to which the subscripts "a", "b" and "c", respectively, have been added, as the corresponding elements of the kingpin 35 and its mounting means.

The arm 54a of the wheel 26 is pivotally connected by a suitable pivot pin 57 to the other end of the tie rod 55 from that connected to pin 56 and in the same manner as that set forth with respect to arm 54 of the wheel 27. Consequently, the turning movement of one rear wheel will cause simultaneous turning movement of the other.

The arm 54b of the kingpin 35b of the front wheel 28 and the arm 54c of the kingpin 35c of the other front wheel 29 are connected to opposite ends of a tie rod 58 by suitable pivot-pin means 59 and 60, respectively.

Referring now particularly to FIGS. 2 and 3 of the drawing, it will be noted that the vertical axes of the four kingpins are displaced laterally outwardly of the outer sides of the wheels, which are rotatably mounted on their axle portions, and also outwardly of the guide surfaces 23a and 24a of the guide flanges 23 and 24 of the roadway R.

Referring now particularly to FIG. 4 of the drawings, the wheel 27, which is shown schematically, is of the usual automobile type having a metal body 64 and is securable by bolts or the like to the bearing means mounted on the axle of the kingpin. A tubeless tire 66 is mounted in the usual manner on the body 64 and is resilient so that it may deform to conform substantially to the curvature of the track 21.

It will be apparent that if the wheel 27 turns, for example, in a clockwise manner as seen in FIG. 3 about the vertical axis of its kingpin, the portion of the tire tread 67 disposed outwardly of the central axis Y—Y of the track 21 will have a greater radius of rotation than the portion of the tire tread engaging the track 21 at the central longitudinal axis Y—Y. As a result, the peripheral speed of the portion of the tire tread to the right of the axis Y—Y will be greater than the peripheral speed of the portion of the tire tread to the left of the axis Y—Y and as a result, the wheel 27 will tend to turn about the vertical axis of the kingpin 35 in a counterclockwise direction until the tread of the tire is again centrally positioned relative to the axis Y—Y.

It will be apparent of course that any turning movement of the wheel 27 is simultaneous with similar turning movement of the wheel 26 due to the provision of the tie rod 55. The front wheels 28 and 29 similarly will tend to travel on the central portions of the tracks 21 and 22 and any lateral displacement thereof from the central portions of the tracks will tend to cause the front wheels to turn back onto the tracks.

It will thus be seen that both the front and the rear wheels are self-steering, and no other steering mechanism is required for the vehicle.

The surfaces of the tracks 21 and 22 are preferably somewhat rough (as, for example, when the roadway is made of concrete) so as to assure proper frictional engagement thereof with the treads of the tires.

The wheels of the vehicle will normally automatically follow and roll along the tracks and around curved portions of the tracks without the tires at any time engaging the surfaces 23a and 24a of the guide flanges 23 and 24.

The roadway may of course be in the form of a loop so that the vehicle may travel thereover continuously in one direction.

The guide surfaces 23a and 24a are preferably smooth and may actually be lubricated with a suitable silicone or grease to diminish the frictional force between the tires and the guide surfaces 23a and 24a in the event of extreme, lateral displacement of the wheels due to excessive side loads imposed on the vehicle, as by gusts of wind or other external forces. The orientation of the guide surfaces 23a and 24a is 2 or 3 degrees from the vertical, such orientation provides much less drag between the tire and the guide surface when contact does occur and the tendency for the tire to ride-up the guide surface and completely over the guide flange at larger angles-of-approach to the curb is thereby reduced.

If the front wheels 28 and 29 (FIG. 3) are caused to turn in clockwise directions about the vertical axes of their kingpins so that the wheels 28 and 29 are so abnormally displaced from the central portions of the tracks 21 and 22 that the side surface of the tire of wheel 29 engages the guide surface 23a (FIG. 2) both lateral and drag forces between the tire of the wheel 29 and the surface 23a cause the front wheels to turn in counter-clockwise directions and back onto the central portions of the tracks 21 and 22, respectively. The rear wheels 26 and 27 will of course similarly tend to turn back onto the central portions of the tracks due to the lateral and drag forces resulting from the engagement of the tire of wheel 27 with the guide surface 23a, due to the fact that the vertical axes of the kingpins are disposed laterally outwardly of the locations of engagement of the outer sides of the tires of the wheels with the guide surfaces. Likewise, if the front and rear wheels are caused to turn in a counterclockwise direction about the vertical axes of their kingpins so that the front and rear wheels are abnormally displaced from the central portions of the tracks, then the resulting reaction between the tires of wheels 28 and 26 with the surface 24a causes the wheels to turn in a clockwise direction and back onto the central portions of the tracks 21 and 22.

In use, assuming now that the electric motor 33 is in operation, the driving engagement of the drive wheel 30 with the flat central surface 25 of the roadway R will provide a forward thrust to the vehicle V and the vehicle will move forwardly along the tracks. If, due to some lateral force exerted on the vehicle, the wheels tend to turn and move to one side or the other of the tracks from their central positions on the tracks 21 and 22, deformation of the tires, as explained above and illustrated in FIG. 4, will cause the areas of contact of the tires with the tracks to lie in sections of imaginary cones whose main axes are the axes-of-rotation of the wheels, and the wheels will turn back onto the central portions of the tracks.

The wheels will of course follow the tracks along curved portions of the roadway in the same manner as along straight portions thereof.

In the event of extreme side loads on the vehicle, which cause such extreme lateral displacement of the wheels that the tires actually engage the guide surfaces 23a and 24a, the resulting reaction-forces between the tires and the guide surfaces will tend to turn the wheels back onto the central portions of the tracks.

Referring now particularly to FIG. 6, a modified form of the roadway R is shown positioned on a bed 70 formed of concrete and provided with longitudinal and transverse reinforcing rods 71 and 72. The roadway R may be formed of sections which may be precast and held onto the bed 70 by means of retainer strips 73, of wood or the like, which are secured to the bed 70 by means of studs 74 whose lower ends are embedded in the bed 70 and which extend upwardly through suitable apertures in the retainer strip 73. Nuts 75 of course are threaded onto the upper ends of the studs 74.

Referring now to FIG. 7 of the drawings, another modified form of the roadway, shown at Ra, is formed of a concrete slab 80 having the tracks 22 and 21 formed thereon. The slab 80 is provided with suitable longitudinal and transverse reinforcing bars. The guide flanges, located outwardly of the tracks 21 and 22, are provided by angle members 81 and 82 whose lower flanges rest upon the outwardly and downwardly sloping surfaces 83 and 83a of the concrete slab 80 and are secured to the slab by means of threaded studs 84 and 84a which extend upwardly through suitable apertures in the lower flanges of the angle members. Nuts 85 and 85a are threaded onto the upper ends of the studs 84 and 84a.

Figure 8:
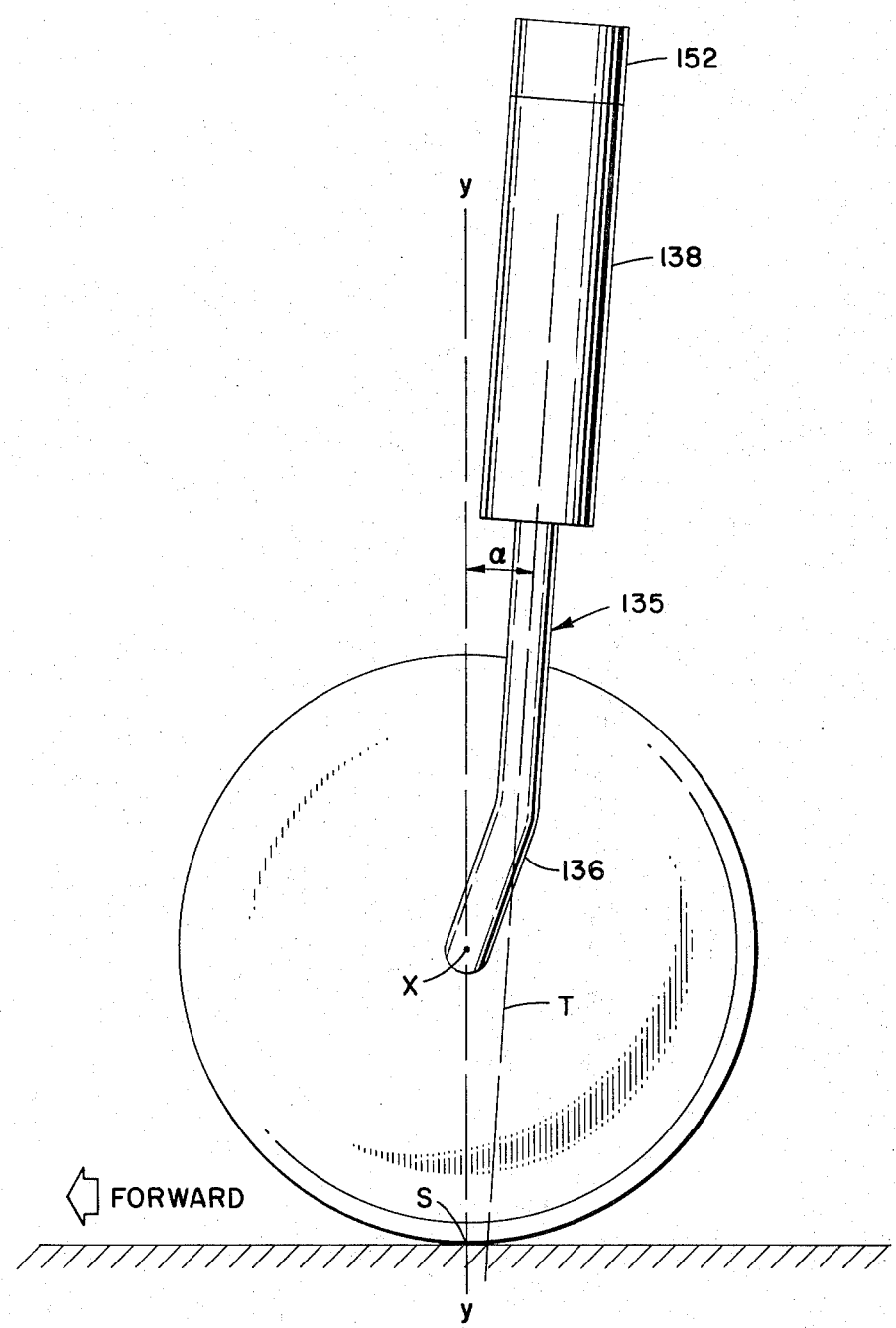
FIG. 8 is a side view of a modified form of the wheel mounting means of the vehicle.

Referring now particularly to FIG. 8, a preferred form of the means for mounting the vehicle on the wheels is illustrated, which provides for additional compensation for excessive side loads and for unbalances of load on the vehicle. The mounting means are similar to those shown in FIG. 5 and accordingly, the mounting means illustrated in FIG. 8 are provided with the same reference numerals, to which the prefix "1" has been added, as the corresponding element of the wheel mounting means illustrated in FIG. 5. The kingpin housing 138 is inclined downwardly and forwardly relative to the body B, and the lower portion 136 of the kingpin 135 is inclined forwardly and downwardly relative to the longitudinal axis of the housing and the longitudinal turning axis T of the kingpin 135.

It will be noted that if a lateral force is now exerted on the vehicle, due to the forward offset of the axis-of-rotation X of the wheel from the axis-of-turning T of the kingpin 135, which results in the center S of the area-of-contact of the tire with the track being spaced forwardly of the intersection of the turning-axis T with the track, the wheels of the vehicle will automatically be turned in directions tending to cause them to move back onto the central portions of the tracks as the forward movement of the vehicle continues. For example, if a side load is imposed on the vehicle V (FIG. 2) from the right to the left, which would tend to move the vehicle to the left, the wheels 26, 27, 28, 29 (FIG. 3) will tend to turn in a counter-clockwise direction about the axes of their kingpins and roll to the right back onto the central portions of the tracks 21 and 22.

It will thus be apparent that additional turning forces or moments are provided by the offset of the axis-of-rotation X of the wheel from the axis-of-turning T of the kingpins which balance or compensate for the lateral forces imposed on the vehicle, as by gusts of wind, to maintain the vehicle properly positioned and moving on the central portions of the tracks.

Due to the fact that the axis-of-turning T of each wheel is spaced outwardly of the location-of-contact of the wheel with the track over which it is rolling, an inward turning moment or force is exerted on each kingpin due to the rolling friction of the wheel. It has been found that this moment or force varies directly and proportionately with the downward load or force exerted on the wheel. If the load is centrally positioned in the body B of the vehicle, the turning moments of the wheels of each pair are balanced and each pair of wheels will roll properly on the tracks. For example, the inward counterclockwise turning moment exerted on the kingpin 35c of the front wheel 29 is equal to the inward clockwise turning moment exerted on the kingpin 35b of the other front wheel 28 since these kingpins are connected by the tie rod 58. However, if the load on one wheel, for example the front wheel 29, is greater than on the other wheel, if the axes-of-turning T of the kingpins were vertical, the front wheels would tend to turn to the right as seen in FIG. 2.

The forward and downward inclination of the turning-axis T causes a turning moment or force to be imparted to the kingpin 135 which varies directly and proportionately with load and in opposite direction to the turning moment exerted on the kingpin due to the rolling friction of the wheel. For example, it has been found that a proper balancing of these moments or forces is obtained by aligning the turning-axis T of the kingpin 135 at an angle "α" relative to the vertical reference line Y—Y, by causing the axis-of-rotation X of the tire and the center S of the area-of-contact between the tire and the track 22 to lie on the vertical reference line Y—Y, and by causing the value of the angle "$\alpha$" to be such that its tangent equals the coefficient of rolling friction between the tire and the track 22. This balancing relationship exists because the moment arm associated with the rolling friction of the tire with the track 22 and the moment arm of the weight moment about the turning-axis T of the kingpin 135 are always equal in length, such moment arm being the lateral distance between the vertical reference line Y—Y passing through the center S of the area of-contact of the tire with the track 22 and the turning-axis T of the kingpin.

It will be apparent that the angle-of-inclination of the turning-axis T is so chosen for wheels having particular characteristics that the turning moments caused by the inclination of the turning axis and the rolling friction of a wheel will vary equally with load so as to balance or null each other.

It will now be seen that while a particular vehicle body and a particular vehicle drive have been illustrated and described, the vehicle body may be of different form, e.g., in the form of a passenger carrying cab and the drive means may be a linear induction motor with its linear station embedded in the roadway and its armature connected to the body.

It will now be seen that a new and improved transportation system has been illustrated and described which includes a roadway, which may be in the form of a closed loop, and self-steering vehicles which may move over the tracks of the roadway without requiring the services of a driver. If the vehicles move at a speed about or somewhat greater than the normal walking speed for a pedestrian, the vehicles may move continuously over the roadway and the passengers may get on and dismount from the vehicles while the vehicles are in motion.

While only one embodiment of the invention, together with several modifications thereof, has been described in detail herein and shown in the accompanying drawing, it will be evident that various further modifications are possible in the arrangement and construction of its components without departing from the scope of the invention.

What is claimed is:

1. A transportation system including:
 a roadway having a pair of parallel longitudinal tracks, said tracks having side surfaces extending divergently downwardly from their top longitudinal center lines; and a vehicle having a pair of front wheels and a pair of rear wheels, said wheels being adapted to roll over said tracks, said wheels having peripheral resilient portions and being rotatable about horizontal axes and turnable about substantially vertical turning axes, the wheels of each pair of wheels being connected for simultaneous turning movement about their substantially vertical axes, said turning axis of each wheel being spaced laterally outwardly of the wheel, said roadway including a pair of longitudinal guide flanges, said pair of tracks being positioned between said guide flanges, each of said guide flanges having a guide surface engageable by wheels of a vehicle on an adjacent track when said wheels tend to move laterally outwardly off the track.

2. The transportation system of claim 1, wherein said guide surface of each guide flange extends outwardly and upwardly of its adjacent track.

3. The transportation system of claim 2, wherein said vehicle has driving means for moving said vehicle over said roadway.

4. The transportation system of claim 3, wherein said turning axes of the wheels of the vehicle on each of the said vehicles are disposed laterally outwardly of said guide surfaces.

5. The transportation system of claim 4, wherein said turning axes of the wheels of said vehicle extend downwardly and forwardly and are spaced rearwardly of the axes of rotation of the wheels for causing the unbalances in the load on the vehicle to vary the turning forces on the wheels in a direction opposite and equal to the variations in the turning-forces caused by the rolling friction between the wheels and the tracks.

6. A transportation system including:
 a roadway having a pair of parallel longitudinal tracks, said tracks having side surfaces extending divergently downwardly from their top longitudinal center lines; and a vehicle having a pair of front wheels and a pair of rear wheels, said wheels being adapted to roll over said tracks, said wheels having peripheral resilient portions and being rotatable about horizontal axes and turnable about substantially vertical turning axes, the wheels of each pair of wheels being connected for simultaneous turning movement about their substantially vertical axes, said turning axis of each wheel being spaced laterally outwardly of the wheel, said turning axes of the wheels of said vehicle extending downwardly and forwardly and being spaced rearwardly of the axes of rotation of the wheels for causing the unbalances in the load on the vehicle to vary the turning-forces on the wheels in a direction opposite and equal to the variations in the turning-forces caused by the rolling friction between the wheels and the tracks.

* * * * *